April 7, 1964  F. BRUNING  3,127,670
METHOD OF AND MACHINE FOR ASSEMBLING SLIDERS
ON SLIDE FASTENER STRINGERS
Filed Dec. 18, 1961  6 Sheets-Sheet 1
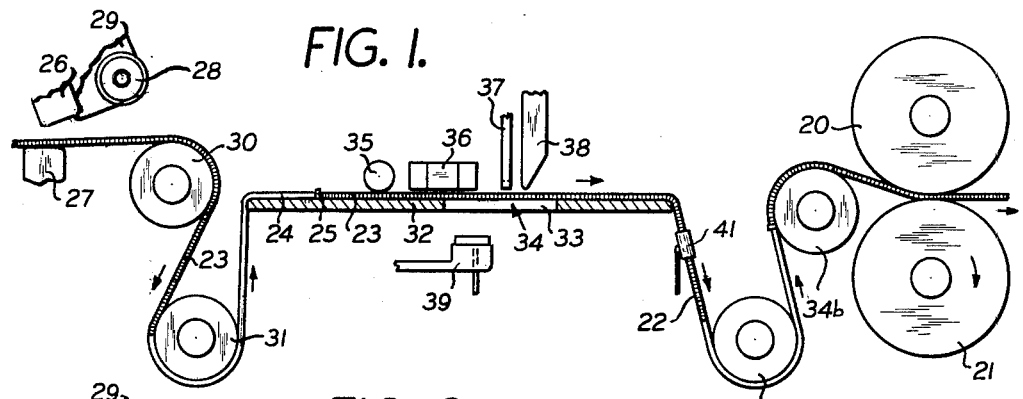
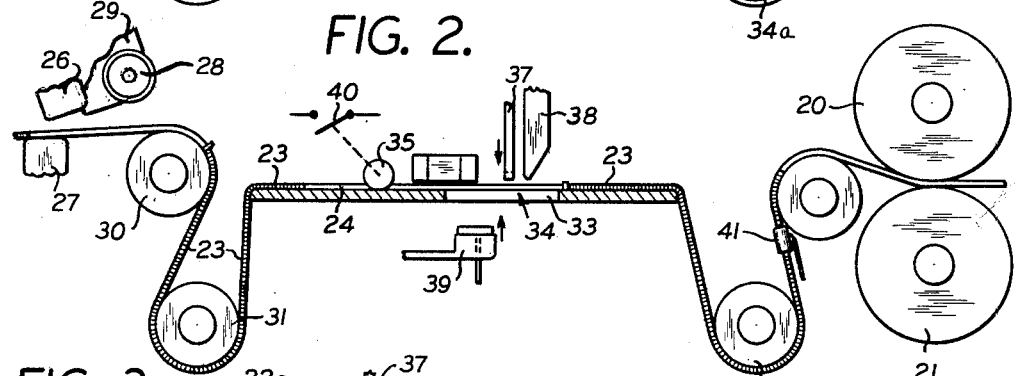
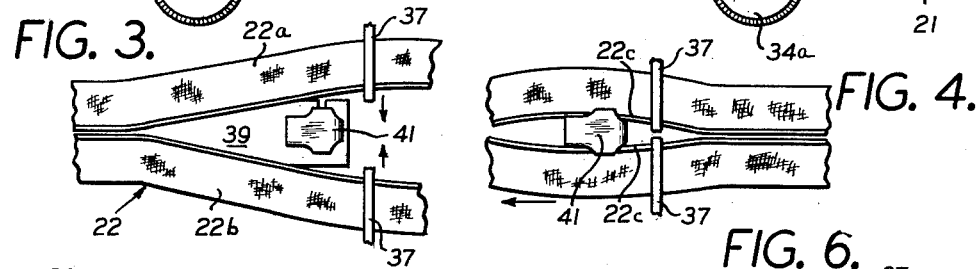
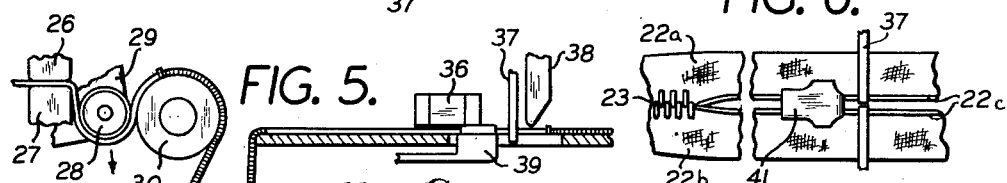
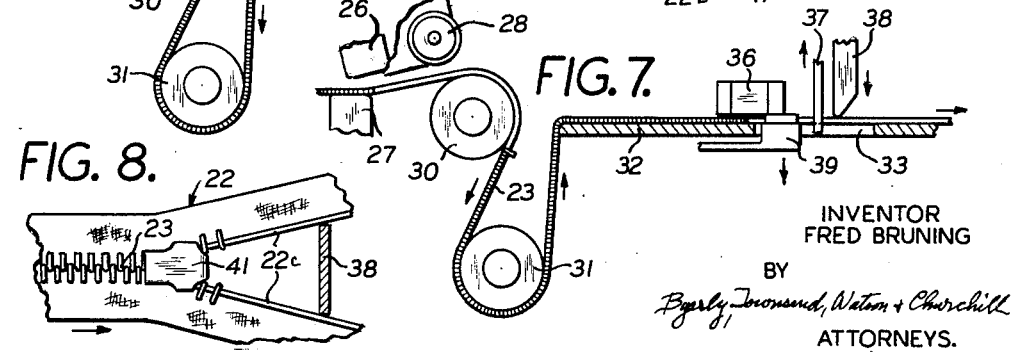
INVENTOR
FRED BRUNING
BY
Byerly Townsend, Watson & Churchill
ATTORNEYS.

INVENTOR
FRED BRUNING

April 7, 1964   F. BRUNING   3,127,670
METHOD OF AND MACHINE FOR ASSEMBLING SLIDERS
ON SLIDE FASTENER STRINGERS
Filed Dec. 18, 1961   6 Sheets-Sheet 4
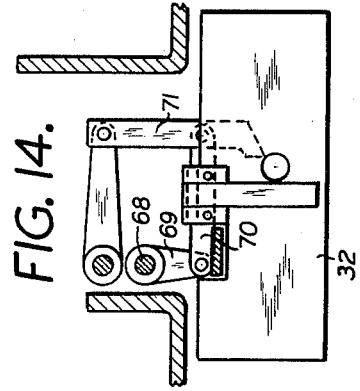
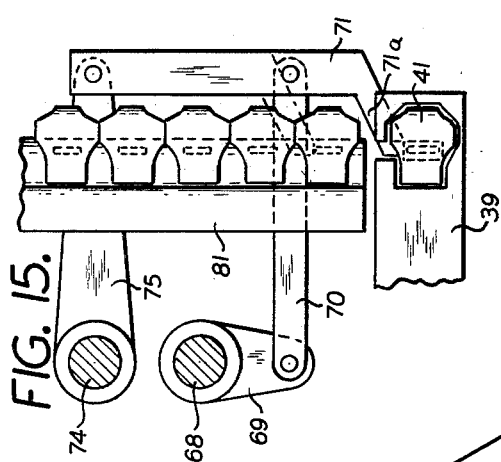
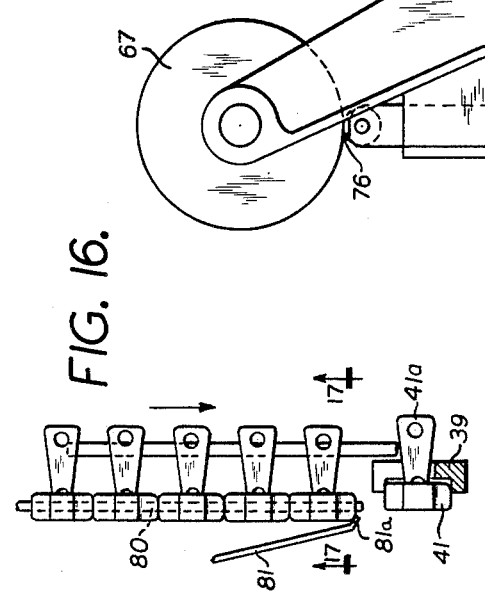
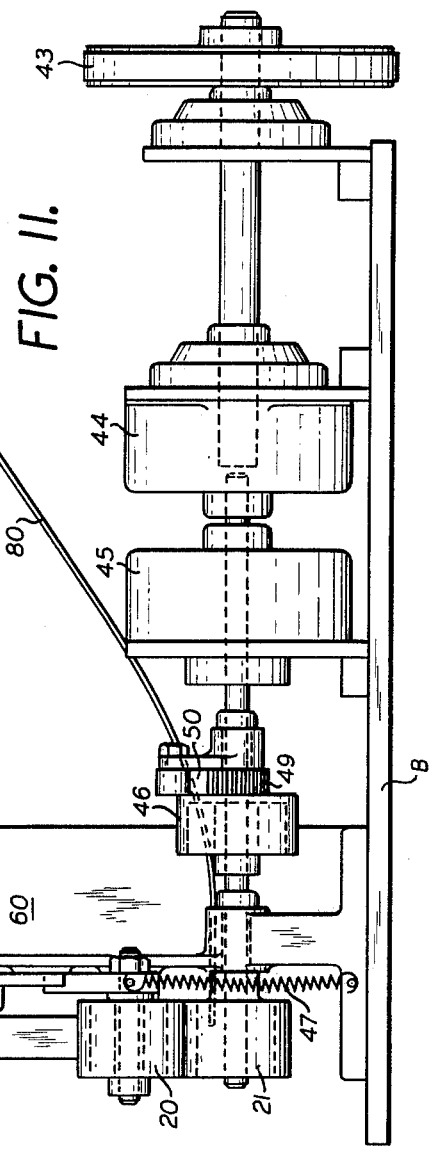
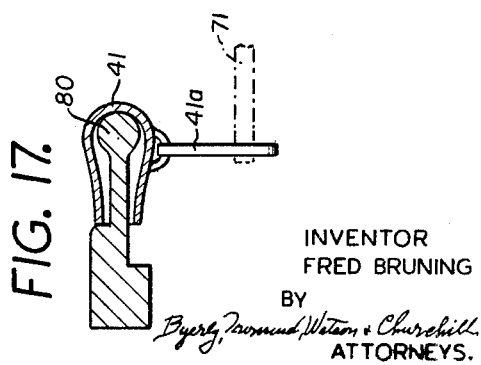
INVENTOR
FRED BRUNING
BY
ATTORNEYS.

INVENTOR
FRED BRUNING
BY
Byerly, Townsend, Watson & Churchill
ATTORNEYS.

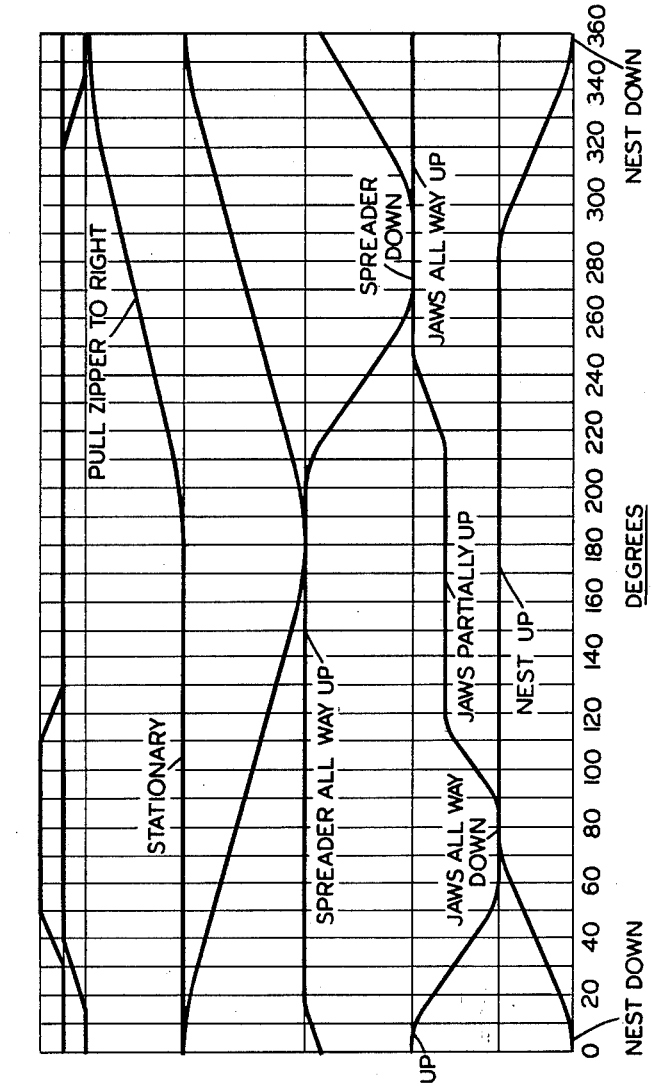

United States Patent Office 3,127,670
Patented Apr. 7, 1964

1

3,127,670
METHOD OF AND MACHINE FOR ASSEMBLING SLIDERS ON SLIDE FASTENER STRINGERS
Fred Bruning, Baldwin, N.Y., assignor to Bruning Bros. Company, Inc., Brooklyn, N.Y., a corporation of New York
Filed Dec. 18, 1961, Ser. No. 159,985
12 Claims. (Cl. 29—408)

The present invention relates to separable slide fasteners of the zipper chain type and more particularly to a method of and a machine for assembling the sliders on the stringers of such fasteners.

One of the practices in the production of separable fasteners of the zipper chain type is to first produce the stringer tapes, then couple together the teeth of a pair of such tapes, then attach the bottom stops, after which the slider is attached to the stringer and finally the top stops are applied. These several operations require considerable handling and varied equipment, are time consuming and add to the cost of the product.

The primary object of the present invention is to substantially simplify and expedite the assembly of the sliders onto the stringers and to do so automatically in a continuous manner.

To accomplish the foregoing object, the stringers are preformed in continuous lengths with gap spaces between successive groups of teeth which are then coupled together and such coupled stringers are pulled through a machine which has an assembling station whereat the following operations are performed:

(1) The pulling operation is stopped when a gap space reaches the assembly station; (2) the adjacent edges of the gap spaced portions of the stringers are then oriented to accommodate a slider; (3) a preformed slider is then positioned between said oriented stringer portions; (4) the beaded edges of the stringers at the gap section are then inserted into the opposed side channels of the slider; (5) the gap section in advance of the mounted slider is then spread apart, and (6) the tape is again advanced to cause engagement of the slider with the teeth on the stringers.

The novel features of the invention will be better understood from the following detailed description when considered in connection with the accompanying drawings showing a preferred embodiment of the invention and wherein:

FIG. 1 is a diagrammatic side view illustrating the relative position of the essential parts of the machine at the start of a slider applying operation.

FIG. 2 is a view similar to FIG. 1 showing the relationship of the parts at the time the movement of the fed tape is stopped.

FIG. 3 is a fractional diagrammatic plan view of the relative position of the parts immediately following the stopping of the fed tape and the presentation of a slider into position.

FIG. 4 illustrates the subsequent step in the method wherein the beaded edges of the stringers are inserted into the opposed channels in the wide end of the slider.

FIG. 5 is a fractional side view of the relationship of parts at the time of pulling the fed tape rearwardly to complete the insertion of the beaded edges of the stringers into the slider.

FIG. 6 is a fractional top view of the relationship of parts after the beaded edges of the tapes have been completely inserted within the channels of the slider.

FIG. 7 is a side view of the relationship of parts just prior to spreading the tapes for causing engagement of the slider with the stringer teeth.

FIG. 8 is a top view of the relationship of parts after the slider has engaged the stringer teeth.

2

Figure 9:
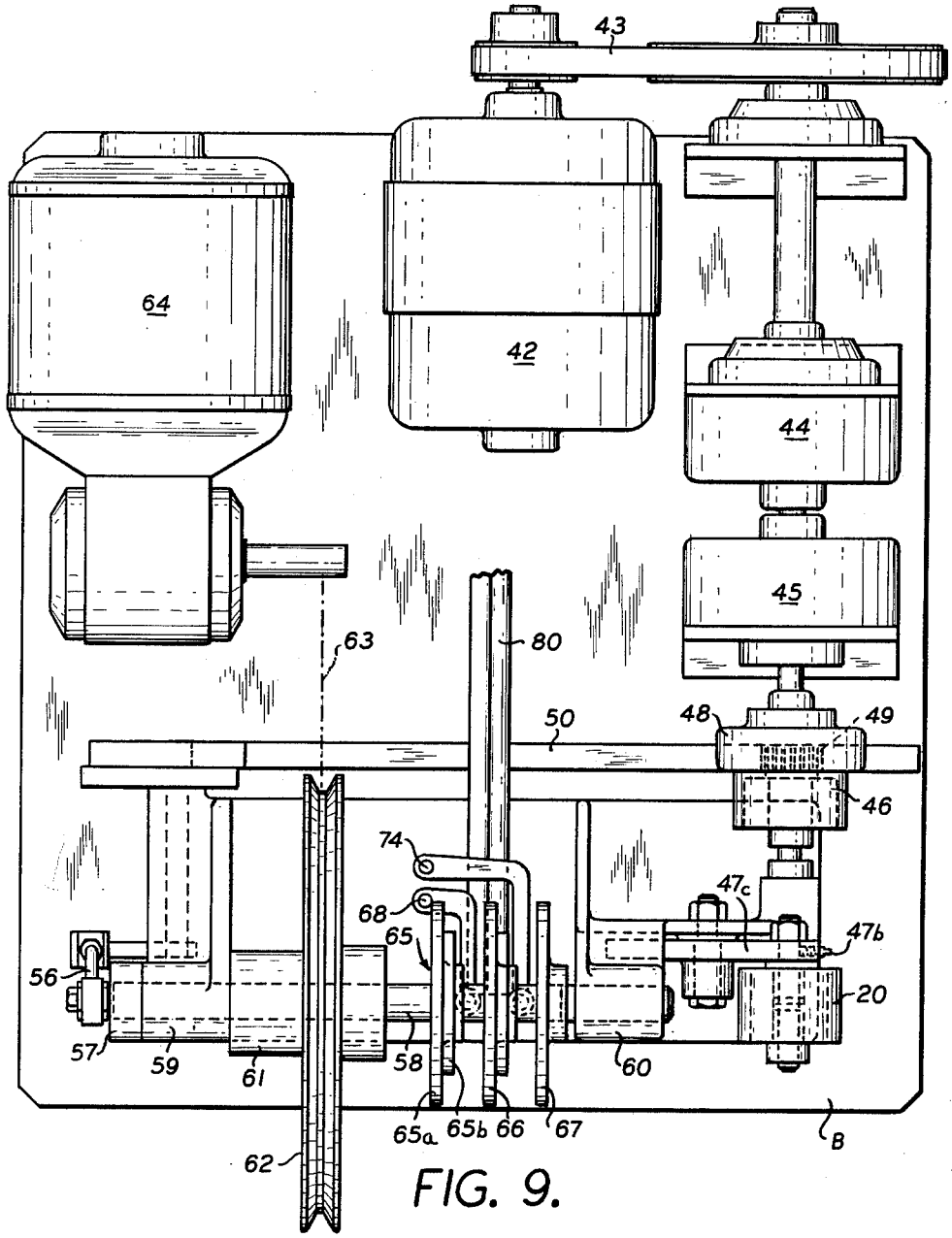

FIG. 9 is a top plan view of the machine embodying the invention.

Figure 10:
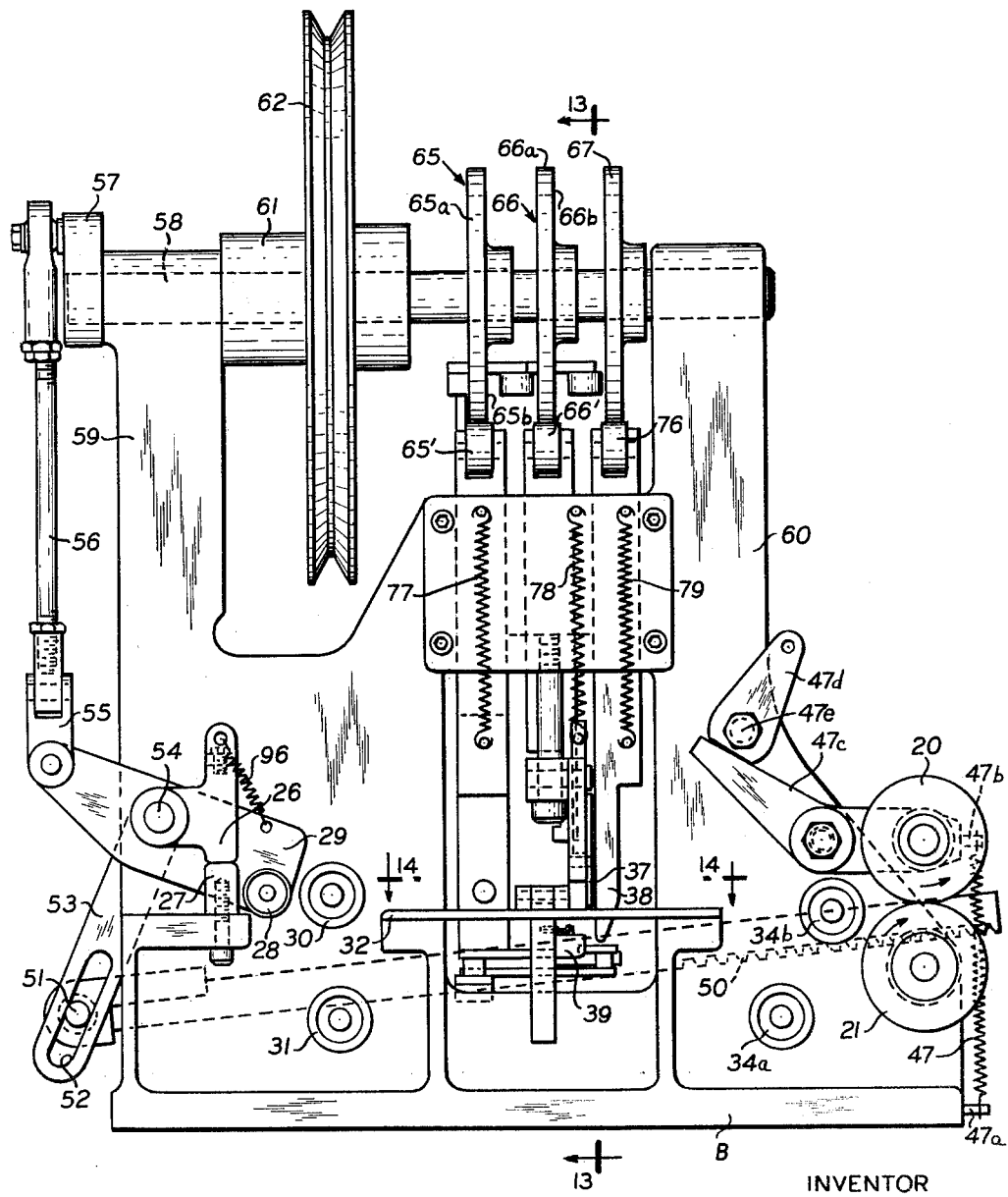

FIG. 10 is a front elevation of the machine shown in FIG. 9.

FIG. 11 is an end view of the machine as viewed from the right side of FIG. 9.

Figure 12:
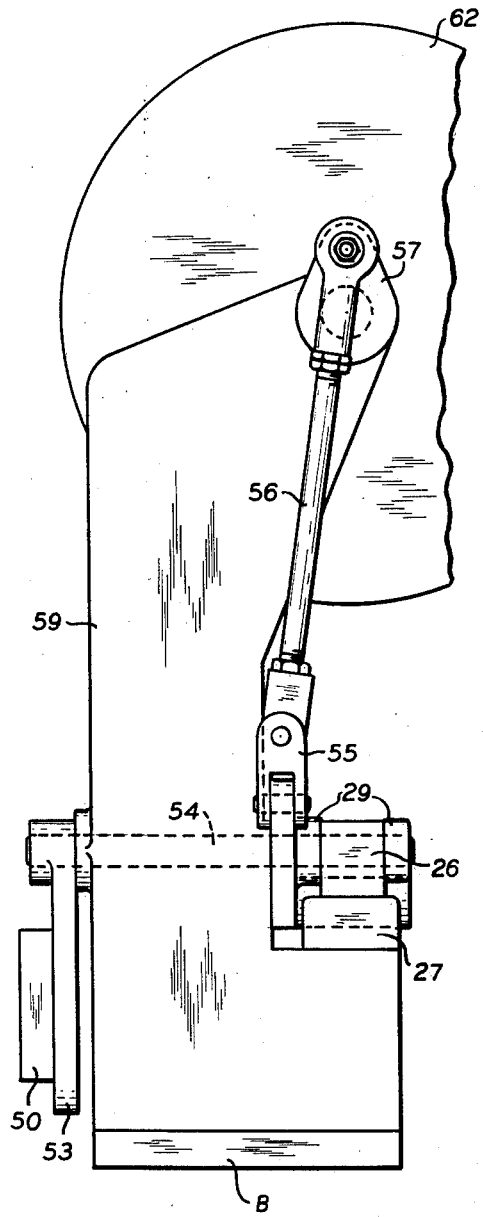

FIG. 12 is an end elevation of a part of the machine as viewed from the left side of FIG. 11.

Figure 13:
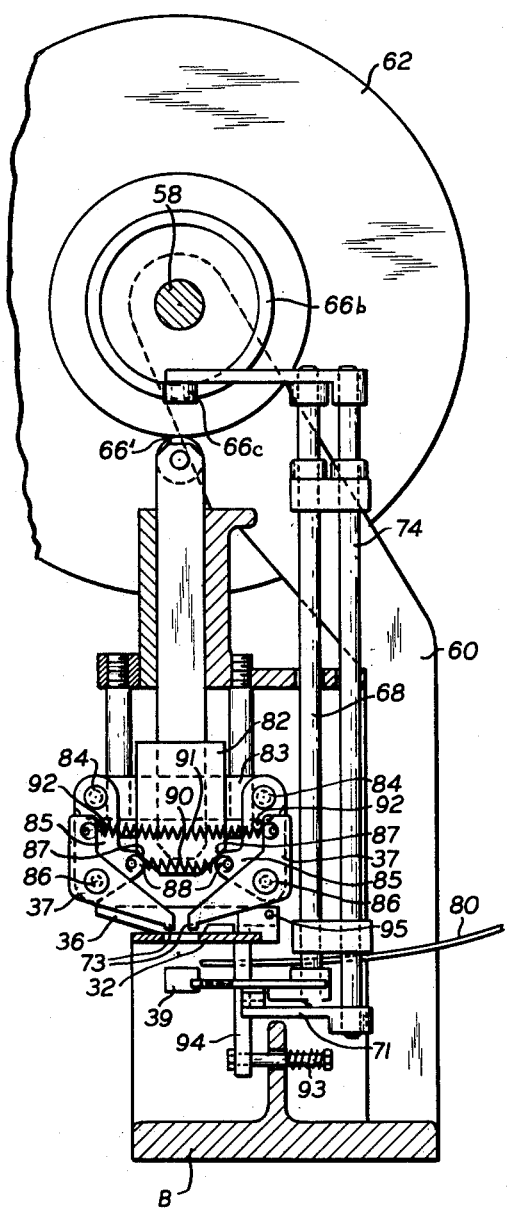

FIG. 13 is a vertical sectional view taken along the line 13—13 of FIG. 10.

FIG. 14 is a horizontal sectional view taken along the line 14—14 of FIG. 10.

FIG. 15 is a partial sectional and top plan view showing the means for operating the transport finger and the path of said finger.

FIG. 16 is a side elevation showing the slider feed track and the engagement of the sliders by the transport finger.

FIG. 17 is a transverse section taken substantially along the plane of the line 17—17 of FIG. 16.

FIG. 18 shows developments of the various cams of the machine in relation to their periods of operation during a single revolution thereof.

Referring first to FIG. 1 to 8 of the drawings where there is shown diagrammatically the principal elements of the machine for applying sliders to stringers of zipper chain fasteners preformed in continuous lengths, the reference characters 20 and 21 indicate a pair of feed or pull rollers adapted to pull through the machine a continuous length of preformed completed stringer tapes 22 consisting of individual stringers 22a, 22b having successive groups of coupled teeth 23 providing a gap space 24 between each pair of successive groups of teeth and end stops 25 at one end of each group of coupled teeth, the stringer tapes being first threaded through the machine between a pressure pad 26 and its anvil 27, beneath a pull-back roller 28 carried by a movable arm 29, then successively over an idler roller 30 under an idler roller 31 and over the top of a table 32 having an opening 33 at a so-called assembly station 34, then under and over guide rollers 34a and 34b. At the assembly station there is mounted in overlying relation to the table a micro-roller 35, a cover plate 36, a pair of movable jaws 37 and a spreader 38 and beneath said opening 33 a movable slider nest 39.

When the feed or pull rollers 20, 21 are set in motion upon the switching-on of a drive motor, hereinafter described, the rollers 20, 21 pull the stringer tape 22 to the right until micro-roller 35, which normally rides on top of the coupled chain teeth encounters a gap space 24 and moves thereinto, and closes a switch 40 (FIG. 2) which in turn functions to stop the motor which drives the pull roller 21 and also operate means hereinafter described for controlling movement of the jaws 37 into the gap space 24 and spread the gap space portions of the stringer tape. A slider 41 which has been fed into position on the slider nest 39 is then moved upwardly into the spread gap space into engagement with the cover plate 36, which is spring loaded to hold the slider in place. The movable jaws 37 are then moved toward each other to force the beaded edges 22c on the stringer tape into the opposite side channels in the wide or Y part of the slider (FIG. 4). The pressure pad 26 is then moved down to clamp the zipper chain as shown in FIG. 5 and the pull-back roller 28 on the arm 29 presses the zipper chain downwardly to move said chain to the left and cause the beaded edges 22c of the gap portions of the stringers to be drawn completely into the side channels of the slider as shown in FIG. 6. As the movable arm 29 rises it carries with it the pressure pad 26 to unclamp the zipper chain, and operates a gear rack (hereinafter described) which rotates a pinion coupled to a one way clutch (also hereinafter described) which is connected to the shaft of the pulling roller 21 which causes the zipper chain to be again pulled to the right. The movable jaws 37 are then raised and the spreader 38 moves downwardly through the opening in the gapped stringers as shown by the arrows in FIG. 7. As the pulling roller 21 continues to pull the stringer tape to the right, the spreader 38 keeps widening the gap section until the small end of the slider is forced onto the teeth of the stringer tape. The nest 39 then moves downwardly and when the slider is in engagement with the teeth, the spreader moves upwardly, the micro-roller 35 again engages the coupled teeth to open the switch 40 and close the switch to the motor which drives the roller 21 and the cycle of operations is repeated.

The means and mechanisms for carrying out the sequence of operations described in the preceding paragraph will now be described.

As shown in FIGS. 9 and 10 of the drawings, the various elements of the machine are supported on a base B. The pull-roller 21 is driven by an electric motor 42, through a drive belt 43, an electric clutch 44, an electric brake 45 and a one way clutch 46. The pull roller 20 is held in engagement with the roller 21 by a tension spring 47, anchored at one end to a pin 47a at the base of the machine and at its other end to a pin 47b carried by a pivoted pressure arm 47c engageable with an arm 47d pivoted at 47e. Between the electric brake 45 and the one way clutch 46 is a rack guide 48 and mounted on the shaft between said electric brake and the one way clutch is a pinion 49 which engages a rack 50 which at its extreme left end (FIG. 10) has a pin 51 engaging in an elongate slot 52 formed in a link 53 fixed on a shaft 54 on which the pressure pad 26 is freely rotatable and the movable arm 29 is also fixed. Connected to the end of movable arm 29 opposite to that at which the pull-back roller 28 is mounted, is a clevis 55 to which is secured one end of a connecting rod 56, the other end of which is pivotally secured to an eccentric crank 57 mounted on a shaft 58 supported in bearings in standards 59, 60. Mounted on the shaft 58 is a one-revolution clutch 61 which when tripped will be rotated by a fly wheel pulley 62 freely rotatable on the shaft 58 by a belt 63 driven by a gear motor 64. The clutch 61 may be suitably tripped to engage the fly wheel 62 by a solenoid (not shown) which is activated upon the closing of switch 40 by the movement of the micro-roller 35 when it enters the gap space in a fed stringer. Also fixedly mounted on the shaft 58 are three cams 65, 66 and 67.

The cam 65 is a compound cam the peripheral surface 65a of which operates through a follower 65' to raise and lower the nest 39 and the right lateral surface 65b of which, as viewed in FIG. 10 and FIG. 11, is a crown cam which operates a rock shaft 68 which in turn is connected through links 69 and 70 to a transport finger 71 (FIGS. 14 and 15). The cam 66 is also a compound cam, the periphery 66a of which operates through a follower 66' to control upward and downward movement of the jaws 37 which has nibs 73 (FIG. 13) the outer surfaces of which function to engage and spread apart the beading 22c of the stringers and the inner surfaces of which function to engage and force said beadings 22c into the opposite channels in the wide or Y end of the slider 41; the right lateral surface 66b of said cam 66 is a crown cam which operates through a cam follower 66c, a rock shaft 74 (FIGS. 13, 14 and 15) which in turn is connected through a link 75 to the transport finger 71. The cam 67 operates through a cam follower 76 to control the movement of the spreader 38. The cam followers 65', 66' and 76 are held in engagement with their respective cams by springs 77, 78 and 79.

The nest 39 is intermittently supplied with a slider 41 having a depending tab 41a which is fed down a track 80 from a hopper (not shown) to the assembling station 34. At the lower end of the track is a leaf spring 81 having a bent lip 81a (FIG. 16) for stopping the downward feed of the sliders until one slider is periodically forced from the track past the spring lip by an angular lip 71a on the transport finger 71 engaging a slider tab 41a as the finger 71 is moved by the links 70 and 75 operated by the rock shafts 68 and 74 respectively and the slider deposited in the nest.

Referring now to FIG. 13 it will be seen that the cam follower 66' at its lower end is formed with an enlargement 82 extending through a movable saddle 83 to which is pivoted at 84 a pair of ears 85 to which in turn are pivoted at 86, the pair of jaws 37. As downward movement of the follower 66' takes place it moves the saddle 83 and with it the jaws 37 to a point where the nibs 73 on the movable jaws overlie and are in close proximity to the top of table 32. Continued downward movement of the enlargement 82 engages a pair of projections 88 on the ears 85 which are pivotally mounted at 84 to move said ears outwardly against the force of a tensioned spring 90 and thus move the jaws 37 outwardly. A second but lighter tension spring 91 connects the upper ends of the jaws while stop pins 92 operate to limit the inward movement of the upper end of the jaws and the outward movement of the jaw nibs 73 after the jaw spreading operation which functions to spread the gap space in the stringers. The pins 92 function after the cam follower 66' moves upwardly to again permit the jaw nibs 73 to move inwardly under the tension of spring 90 to engage the beading on the stringer to force said beadings into the wide ends of the channels in a positioned slider as shown in FIG. 4. Just prior to the closing of the jaws for forcing the stringer beadings into the sliders, the nest 39 containing a slider which has been positioned in the nest by the transport finger 71 is raised into the gap space by the cam 65 and is held in position by engagement with the cover plate 36 which is spring pressed downwardly against the top of the table 32 by a spring 93 which biases a depending arm 94 on the cover plate 36 which is pivoted at 95.

After movement of the stringer beadings into the wide end of a slider and while the slider is being held in the spread gap section, the crank 57 draws the connecting rod upwardly to move the pull-back roller 28 downwardly and with it the pressure pad 26 through the spring connection 96 between the movable arm 29 and the pressure pad 26. This action operates to first clamp the stringer tape between the pressure pad 26 and its anvil or fixed clamp block 27 and then engage the stringer tape rearwardly of the idler roller 30 to pull back the stringer to the left to cause the beaded edges thereon which have been partially engaged in the side channels of the slider to be drawn completely into said side channels. This rearward movement of the stringer is possible because the one-way clutch 46 permits counter-clockwise rotation of the pull roller 21. As the crank again moves downwardly in the course of making its single revolution, the link 53 fixed on the shaft 54 moves the rack 50 to the right to rotate the pinion 49 in a clockwise direction to again feed or pull the tape through the machine. However just before this action takes place, the jaws are moved upwardly and the nest is moved downwardly out of the path of the pulled tape and the spreader 38 is moved into the gap space in advance of the slider to facilitate engagement of the narrow end of the slider with the stringer teeth. As this takes place the spreader is withdrawn, the micro-roller rides upon the teeth to close the switch 40 and start the motor 42 to automatically repeat the cycle of operations.

The timing of the various mechanisms in performing their respective operations will be readily understood from a consideration of the cam developments shown in FIG. 18 and the legends appearing thereon.

Although I have shown and described a preferred embodiment of the invention and a preferred method of applying sliders to preformed zipper chain stringers of continuous length, it is to be understood that changes in the constructional details of the machine for carrying out the method may be resorted to within the range of engineering skill without departing from the spirit of the invention as hereinafter claimed.

What I claim is:

1. The method of attaching a slider to coupled stringers of a zipper chain which comprises:
   (a) feeding to an assembly station a length of such coupled stringers having at the leading end thereof adjacent beaded untoothed edges followed by coupled teeth which are free to be disengaged,
   (b) orienting the adjacent beaded untoothed edges of the stringers, in advance of the assembly station to accommodate a slider,
   (c) positioning at the assembly station a preformed slider,
   (d) inserting the oriented beaded untoothed edges of the stringers into the slider channels at the opposite sides of the slider, and
   (e) then spreading and advancing the leading spread edges of the stringers to cause engagement of the slider with the teeth on the stringers.

2. The method of producing lengths of separable fasteners with each length consisting of a pair of coupled stringer tapes having a slider assembled therewith which comprises:
   (a) feeding to an assembly station a continuous length of a pair of coupled stringers having successive spaced groups of interlocked teeth providing a gap section between successive groups of teeth,
   (a-1) stopping said feeding when a gap section of the coupled stringers reaches an assembly station,
   (b) spreading the adjacent beaded edges of the stringers at a gap section, to accommodate a slider,
   (c) positioning at the assembly station a preformed slider between said spread stringers,
   (d) inserting the oriented beaded edges of the stringers at the gap section into the opposed side channels of a slider,
   (e) then spreading and advancing the leading spread edges of the stringers to cause engagement of the slider with the teeth on the stringers.

3. The method of producing lengths of separable fasteners with each length consisting of a pair of coupled stringer tapes having a slider assembled therewith which comprises:
   (a) feeding a continuous length of a pair of coupled stringers having successive spaced groups of interlocked teeth providing a gap section between successive groups of teeth,
   (b) stopping said feeding when a gap section of the coupled stringers reaches an assembly station,
   (c) spreading the adjacent beaded edges of the stringers at a gap section,
   (d) positioning at the assembly station a preformed slider between said spread stringers,
   (e) moving the beaded edges of the stringers toward each other and into the Y or wide end channels at the opposite sides of the slider,
   (f) pulling the fed tape rearwardly to its normal direction of feed to cause the beading of the stringers to completely enter the channels in the slider,
   (g) spreading the gap section in advance of the mounted slider, and
   (h) then advancing the spread edges of the stringers to cause engagement of the small end of the slider with the teeth on the stringers.

4. A machine for applying sliders to separable fastener tapes in the form of a continuous length of coupled stringers having successive spaced groups of interlocked teeth, each group of interlocked teeth providing therebetween a gap section, comprising:
   (a) an assembling station,
   (b) means for feeding said continuous length of coupled stringers past said assembly station,
   (c) means for engaging within a gap section to stop temporarily the feed of the stringers when a gap section reaches the assembly station,
   (d) means for spreading the gap section at the assembly station,
   (e) means for positioning a preformed slider in said spread gap section,
   (f) means for inserting the beaded edges of the stringers into the opposed channels of the positioned slider,
   (g) means for again spreading the stringers in advance of the applied slider, and
   (h) means for advancing the stringers while held spread apart by the means (g) for causing the teeth of the stringers to engage within the slider.

5. A machine according to claim 4, wherein the means (c) controls the operation of the means (d), (e), (f), (g) and (h).

6. A machine according to claim 4, wherein the means (c) operates a micro-switch which controls a single revolution clutch on a shaft on which are mounted cams for operating the means (d), (e), (f) and (g).

7. A machine according to claim 4, wherein the means (d) and (f) comprise a pair of jaws which when operated to open, function to spread the stringers apart and subsequently when operated to partially close they function to force the beaded edges of the stringers into the channels in the Y or wide end of a slider.

8. A machine according to claim 7, wherein:
   (i) means rearwardly of the assembling station operate to clamp the stringers and
   (j) means between (a) and (i) operate to draw the fed stringers rearwardly to cause the beads on the stringers to completely enter the channels in the narrow end of the slider.

9. A machine according to claim 8, wherein the means (g) is operative to spread the stringers after the means (d) and (f) have been withdrawn from their operative positions and the means (i) and (j) have performed their respective functions.

10. A machine according to claim 9, wherein the means (c) is restored to its initial position by the advancing tape for repeating the cycle of operations.

11. A machine according to claim 10, wherein the means (b) comprises a pair of pulling rollers in advance of the assembling station and driven by an electric motor through an electric brake and a one way clutch which permits a rearward movement of the tape through the pulling rollers when the tape is clamped rearwardly of the assembling station.

12. A machine according to claim 6, wherein a continuously rotating fly wheel is loosely mounted on the shaft on which is also mounted the single revolution clutch and the cams (d), (e), (f) and (g).

References Cited in the file of this patent

UNITED STATES PATENTS

| | | |
|---|---|---|
| 2,219,165 | Nedal | Oct. 22, 1940 |
| 2,879,588 | Morin | Mar. 31, 1959 |